United States Patent
Grant et al.

(10) Patent No.: US 11,221,897 B2
(45) Date of Patent: Jan. 11, 2022

(54) MANAGING DEVICE MAINTENANCE VIA ARTIFICIAL INTELLIGENCE

(71) Applicant: International Business Machines Corporation, Armonk, NY (US)

(72) Inventors: Robert H. Grant, Atlanta, GA (US); Shikhar Kwatra, Durham, NC (US); Zachary A. Silverstein, Jacksonville, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/568,016

(22) Filed: Sep. 11, 2019

(65) Prior Publication Data

US 2021/0073060 A1 Mar. 11, 2021

(51) Int. Cl.
G06F 11/07 (2006.01)
G06F 11/00 (2006.01)
G06N 20/00 (2019.01)

(52) U.S. Cl.
CPC ........... *G06F 11/004* (2013.01); *G06N 20/00* (2019.01); *G06F 2201/875* (2013.01)

(58) Field of Classification Search
CPC ... G06F 11/004; G06F 11/079; G06F 11/0709
See application file for complete search history.

(56) References Cited

U.S. PATENT DOCUMENTS 6,222,445 B1* 4/2001 Beckhusen ............. F02P 17/12
307/10.6
7,423,408 B2* 9/2008 Koch ................... G01R 31/367
320/132

(Continued)

FOREIGN PATENT DOCUMENTS

EP 2713032 A2 4/2014

OTHER PUBLICATIONS

Matthews, Kayla. Predictive Maintenance With IoT: What It Means for Manufacturing. Manufacturing.net, Jun. 1, 2018. [3 printed pages] <https://www.manufacturing.net/article/2018/06/predictive-maintenance-iot-what-it-means-manufacturing>.
IBM. The value of preventive maintenance. IBM Watson IoT, Accessed on May 9, 2019. [3 printed pages] <https://www.ibm.com/internet-of-things/solutions/enterprise-asset-management/what-is-preventive-maintenance>.

(Continued)

*Primary Examiner* — Kamini B Patel
(74) *Attorney, Agent, or Firm* — The Steadman Law Firm PLLC (57) ABSTRACT

Techniques are described with respect to managing device maintenance. An associated method includes constructing a machine learning knowledge model associated with a plurality of devices in a client ecosystem based upon at least one course of device evaluation. The method further includes collecting, from a plurality of device sensors, device sensor data associated with each of the plurality of devices and collecting, from a plurality of environmental sensors, environmental sensor data associated with each of the plurality of devices. The method further includes analyzing, via the machine learning knowledge model, the device sensor data in view of the environmental sensor data to determine a failure risk value for each of the plurality of devices. Responsive to the failure risk value for any device among the plurality of devices exceeding a predefined failure risk threshold, the method further includes facilitating activation of the device for a designated duration of time.

17 Claims, 5 Drawing Sheets

(56) References Cited

U.S. PATENT DOCUMENTS

| | | | | |
|---|---|---|---|---|
| 9,792,397 | B1* | 10/2017 | Nagaraja | G06F 30/327 |
| 10,627,823 | B1* | 4/2020 | Kim | G06N 3/006 |
| 10,922,409 | B2* | 2/2021 | Wang | G06N 3/006 |
| 10,970,771 | B2* | 4/2021 | Kumar | G06N 20/00 |
| 2016/0071517 | A1* | 3/2016 | Beaver | G10L 15/22 704/9 |
| 2016/0209831 | A1* | 7/2016 | Pal | G05B 19/4185 |
| 2016/0313216 | A1* | 10/2016 | Pal | B23Q 17/0971 |
| 2018/0059656 | A1* | 3/2018 | Hiruta | G05B 23/0267 |
| 2018/0095155 | A1* | 4/2018 | Soni | G08G 5/0086 |
| 2018/0260498 | A1* | 9/2018 | Nagaraja | G06F 30/3323 |
| 2019/0072916 | A1* | 3/2019 | Fuji | G06N 20/00 |
| 2019/0121318 | A1* | 4/2019 | Fan | G05B 23/0283 |
| 2019/0178680 | A1* | 6/2019 | Kriss | G06Q 10/08 |
| 2020/0005185 | A1* | 1/2020 | Kim | G06N 7/005 |
| 2020/0143206 | A1* | 5/2020 | Kartal | G06N 3/0472 |
| 2020/0143208 | A1* | 5/2020 | Hernandez Leal | G06F 9/3822 |
| 2020/0151564 | A1* | 5/2020 | Nakhaei Sarvedani | G01S 17/89 |
| 2021/0056384 | A1* | 2/2021 | Ko | G06N 3/0445 |

OTHER PUBLICATIONS

Autobild India. 10 Tips to Store your Car Properly. Business Today: Money Today, Aug. 2013. [3 printed pages] <https://www.businesstoday.in/moneytoday/travel/auto-bild-tips-if-parking-car-for-long-period-storage-tips/story/197113.html>.

* cited by examiner

MANAGING DEVICE MAINTENANCE VIA ARTIFICIAL INTELLIGENCE

BACKGROUND

The various embodiments described herein generally relate to device analysis via artificial intelligence. More specifically, the various embodiments relate to maintenance of a plurality of devices using machine learning techniques.

Idling of devices in a client ecosystem for extended durations, whether through client absence or other reasons of client unavailability, may impact the condition of such devices. Degradation during idle cycles is a significant issue that may adversely affect device longevity. During an idle cycle, deteriorating factors may impact lifespan of device components. For instance, battery discharge issues may arise as a result of excessive idle cycle length. Additionally, idle cycle degradation may be exacerbated due to device wear factors such as dust or moisture and/or environmental exposure factors such as temperature, humidity, or precipitation.

SUMMARY

The various embodiments described herein provide techniques of managing device maintenance via artificial intelligence, specifically machine learning. An associated computer-implemented method includes constructing a machine learning knowledge model associated with a plurality of devices in a client ecosystem based upon at least one course of device evaluation. The method further includes collecting, from a plurality of device sensors, device sensor data associated with each of the plurality of devices and collecting, from a plurality of environmental sensors, environmental sensor data associated with each of the plurality of devices. The method further includes analyzing, via the machine learning knowledge model, the device sensor data in view of the environmental sensor data to determine a failure risk value for each of the plurality of devices. Responsive to the failure risk value for any device among the plurality of devices exceeding a predefined failure risk threshold, the method further includes facilitating activation of the device for a designated duration of time.

In an embodiment, the step of constructing the machine learning knowledge model includes storing in at least one knowledge base operational information for each of the plurality of devices during the at least one course of device evaluation and storing in the at least one knowledge base environmental information associated with each of the plurality of devices during the at least one course of device evaluation. According to such embodiment, the step of constructing the machine learning knowledge model further includes applying at least one artificial intelligence algorithm to train the machine learning knowledge model based upon the stored operational information and the stored environmental information. The at least one artificial intelligence algorithm optionally includes at least one clustering algorithm that generates at least one output reflecting failure trends with respect to the plurality of devices. Furthermore, the machine learning knowledge model optionally is a multi-agent reinforcement learning model. According to such embodiment, the at least one artificial intelligence algorithm includes a multi-agent reinforcement learning (MARL) algorithm that applies multi-objective optimization to the plurality of devices. Additionally, the multi-agent reinforcement learning model optionally is trained in conjunction with a long short-term memory recurrent neural network (LSTM-RNN) architecture configured to store time series pattern data with respect to the plurality of devices.

In an embodiment, the step of facilitating activation of the device includes accessing a dataset enumerating at least one maintenance action with respect to the device, selecting one or more actions among the at least one maintenance action in the dataset based upon the failure risk value and the analysis of the device sensor data in view of the environmental sensor data, and facilitating initiation of the selected one or more actions. In another embodiment, the step of facilitating activation of the device includes facilitating charging of a battery component associated with the device. In a further embodiment, the step of facilitating activation of the device includes initiating operation of at least one physical component of the device. The designated duration of time optionally is determined at least in part based upon the device sensor data associated with the device. Additionally or alternatively, the designated duration of time optionally is determined at least in part based upon the environmental sensor data associated with the device.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having a processor and a memory storing an application program, which, when executed on the processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

The various embodiments described herein are directed to managing device maintenance via artificial intelligence. Specifically, the various embodiments may address degradation resulting from extended idle cycles, device wear, and/or environmental exposure. A server system configured to implement techniques associated with the various embodiments includes a device management application configured to analyze device sensor data in view of environmental sensor data via a machine learning knowledge model in order to determine a failure risk value for each of a plurality of devices. The device management application facilitates activation of any device, e.g., autonomously or semi-autonomously, responsive to the failure risk value for such device exceeding a predefined failure risk threshold.

The various embodiments described herein may have advantages over conventional techniques. Specifically, the various embodiments may facilitate automation of device maintenance in a client ecosystem and may improve computer technology by analyzing collected sensor data via machine learning in order to assess device failure risk and to address such risk through device activation. Such machine learning may entail application one or more artificial intelligence algorithms, optionally including a multi-agent reinforcement learning algorithm that manages baseline operation associated with respective device clusters. The various embodiments may apply multi-objective optimization to calibrate device usage in such a way that addresses maintenance requirements while maximizing device longevity. By facilitating device activation based upon multi-agent reinforcement learning and multi-objective optimization, the various embodiments may manage longevity of the plurality of devices, particularly longevity of mechanical components, electrical components, and/or battery components. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to device maintenance via artificial intelligence. However, it is to be understood that the techniques described herein may be adapted to a variety of purposes in addition to those specifically described herein. Accordingly, references to specific embodiments are included to be illustrative and not limiting.

Figure 1:
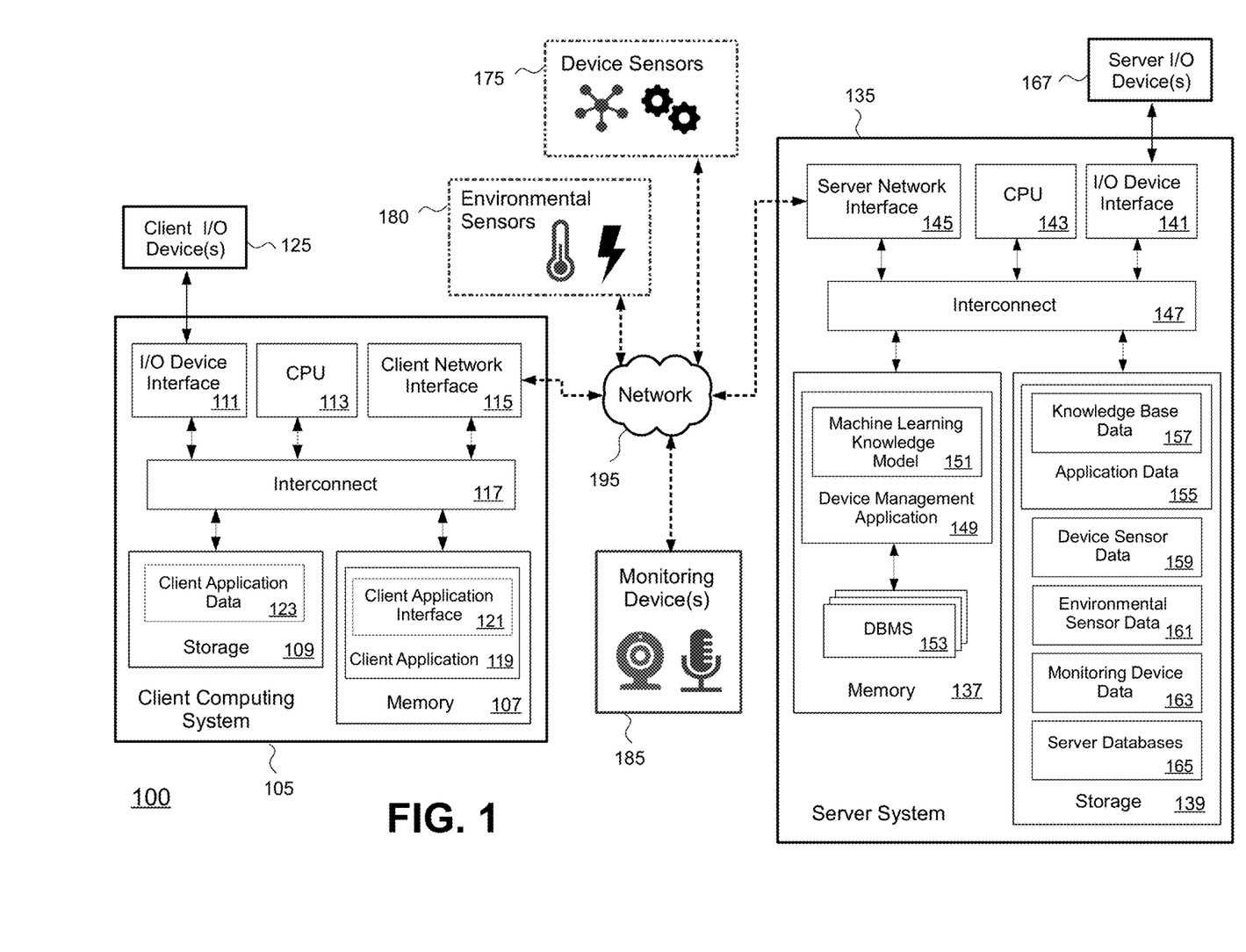
FIG. 1 illustrates a computing infrastructure, according to one or more embodiments.

FIG. 1 illustrates a computing infrastructure 100, according to an embodiment. As shown, computing infrastructure 100 includes a client computing system 105, a server system 135, a plurality of device sensors 175, a plurality of environmental sensors 180, and monitoring device(s) 185, each connected to a communications network 195. Computing infrastructure 100 facilitates device maintenance of a plurality of devices, such as those included in a client ecosystem further described with respect to FIG. 2.

Illustratively, client computing system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client computing system 105 are accessed or controlled by one or more clients. Although shown as a single computing system, client computing system 105 is included to be representative of a single client or multiple clients. The one or more clients associated with the client computing system 105 (or multiple respective client computing systems 105) may include at least one entity associated with device management, including a network administrator, a homeowner, or an office manager. In an embodiment, client computing system 105 is a thin client. Memory 107 includes a client application 119. In an embodiment, client application 119 is an online application configured for interfacing with server system 135 and other computing systems. Client application 119 includes a client application interface 121. In the event of multiple clients, multiple instances of client computing system 105 may be present, each having a respective client application 119 including at least one respective client application interface 121. Client application interface 121 includes a graphical user interface (GUI), a command line interface, and/or a sensory interface (e.g., capable of discerning and processing client sound/voice commands and/or client gestures). Storage 109 includes client application data 123 associated with client application 119. One or more components of a GUI, a command line interface, and/or a sensory interface included in client application interface 121 may facilitate client input and/or may facilitate display of client application data 123. I/O device interface 111 is communicatively coupled to client I/O device(s) 125 (e.g., touchscreen console, trackpad, joystick, microphone, speaker, etc.). The client(s) may interact with client application interface(s) 121 via client I/O device(s) 125. CPU 113 is included to be representative of a single CPU, multiple CPUs, a single CPU having multiple processing cores, and the like. Client network interface 115 is configured to receive data from and transmit data to server system 135 via network 195.

Although shown as a single computing system, server system 135 is included to be representative of a single server system or multiple server systems. In an embodiment, server system 135 includes a single hardware server configured to provide hosting capabilities. In an alternative embodiment, server system 135 includes, or is otherwise operatively coupled to, a plurality of hardware and/or virtualized servers configured to provide hosting capabilities. In a further alternative embodiment, server system 135 is a cloud server system configured to provide distributed hosting capabilities via a plurality of nodes in a cloud computing environment. According to such further alternative embodiment, the cloud computing nodes are configured to communicate with one another. Additionally, according to such further alternative embodiment, the cloud computing environment optionally offers infrastructure, platforms, and/or software as a service for which client computing system 105 or other systems associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a device management application 149. Device management application 149 includes or is otherwise operatively coupled to a machine learning knowledge model representation 151. In an embodiment, device management application 149 is configured to execute at least one artificial intelligence algorithm utilizing at least one machine learning technique via machine learning knowledge model representation 151.

According to such embodiment, machine learning knowledge model representation 151 includes or otherwise is operatively coupled to a machine learning knowledge model and at least one knowledge base associated therewith. According to such embodiment, some or all aspects of the machine learning knowledge model may run within server system 135. Additionally or alternatively, some or all aspects of machine learning knowledge model may run externally to server system 135, e.g., via a cloud-based implementation, in which case server system 135 communicates with or accesses such aspects of the machine learning knowledge model via machine learning knowledge model representation 151. Some or all aspects of the at least one knowledge base optionally are incorporated into server system 135. Alternatively, some or all aspects of the at least one knowledge base are externally located and communicatively coupled to server system 135. Memory 137 further includes or is otherwise operatively coupled to database management system (DBMS) 153. DBMS 153 is included to be representative of a single database system or multiple database systems. Device management application 149 is configured to manage device maintenance according to the various embodiments described herein. In an embodiment, device management application 149 facilitates authentication of client computing system 105 and/or other client systems in computing infrastructure 100. In an alternative embodiment, device management application 149 sends authentication information associated with client computing system 105 and/or other client systems to an external directory server system, which may in turn perform any necessary authentication steps.

Storage 139 includes device management application data 155. Device management application 149 generates and processes device management application data 155 based on interaction with other components of computing infrastructure 100. In an embodiment, one or more aspects of device management application 149 and/or device management application data 155 are cloud-based. Device management application data 155 includes knowledge base data 157 generated by, used by, or otherwise associated with the machine learning knowledge model. Knowledge base data 157 includes datapoints pertaining to maintenance history, lifespan, and/or characteristics associated with management of a plurality of devices, e.g., in a client ecosystem. In an embodiment, knowledge base data 157 includes data associated with the at least one knowledge base. Storage 139 further includes device sensor data 159 associated with (e.g., received from) the plurality of device sensors 175. Storage 139 further includes environmental sensor data 161 associated with (e.g., received from) the plurality of environmental sensors 180. Storage 139 further includes monitoring device data 163 associated with (e.g., received from) the monitoring device(s) 185. Storage 139 further includes server databases 165. DBMS 153 includes or interfaces with at least one software application configured to manage server databases 165. In an embodiment, device management application 149 sends database requests to DBMS 153 and processes results returned by DBMS 153. In a further embodiment, server databases 165 include one or more relational databases. In an additional embodiment, server databases 165 include one or more ontology trees or other ontological structures. Server system 135 (and more generally computing infrastructure 100) may include any number of databases. According to a further embodiment, DBMS 153 sends requests to remote databases (not shown) via network 195.

I/O device interface 141 is communicatively coupled to server I/O device(s) 167. CPU 143 is included to be representative of a single CPU, multiple CPUs, a single CPU having multiple processing cores, and the like. Server network interface 145 is configured to receive data from and transmit data to client computing system 105 or other client system(s) via network 195. Specifically, device management application 149 is configured to accept requests sent by client computing system 105 or other client system(s) to server system 135 and is configured to transmit data to client computing system 105 or other client system(s) via server network interface 145. Furthermore, server network interface 145 is configured to receive data from and/or transmit data to the plurality of device sensors 175 and/or the plurality of environmental sensors 180 via network 195.

The plurality of device sensors 175 are Internet of Things (IoT) sensors capable of communicating with other systems or devices in computing infrastructure 100, including client computing system 105, server system 135, the plurality of environmental sensors 180, and/or monitoring device(s) 185. In an embodiment, the plurality of device sensors 175 include analog sensors and/or digital sensors. One or more sensors among the plurality of device sensors 175 optionally include both analog characteristics and digital characteristics. In a further embodiment, one or more of the plurality of device sensors 175 are located within, are located on or otherwise attached to, or otherwise are associated with one or more respective devices or respective device components among a plurality of devices, e.g., in a client ecosystem. In the context of the various embodiments described herein, a device is any machine, hardware-based computing system, article of manufacture, or appliance capable of being managed through a network (e.g., a local area network in a home or office environment). A device or one or more components thereof optionally include autonomous capabilities, i.e., capable of functioning without user intervention, or semi-autonomous capabilities, i.e., capable of functioning with limited user intervention. A device optionally includes software components and/or one or more digital interfaces to facilitate device operation and/or to facilitate interaction with any entity associated with a client ecosystem or another environment. In a further embodiment, one or more of the plurality of device sensors 175 are associated with one or more of monitoring device(s) 185.

The plurality of environmental sensors 180 are IoT sensors capable of communicating with other systems or devices in computing infrastructure 100, including client computing system 105, server system 135, the plurality of device sensors 175, and/or monitoring device(s) 185. In an embodiment, the plurality of environmental sensors 180 include analog sensors and/or digital sensors. One or more sensors among the plurality of environmental sensors 180 optionally include both analog characteristics and digital characteristics. In a further embodiment, the plurality of environmental sensors include a thermometer, an anemometer, a hygrometer, etc. In another embodiment, one or more of the plurality of environmental sensors 180 are located within or are located on or otherwise attached to one or more respective devices or respective device components among a plurality of devices, e.g., in a client ecosystem. Additionally or alternatively, one or more of the plurality of environmental sensors 180 otherwise are operatively coupled to or associated with, e.g., located in the vicinity of, one or more respective devices or respective device components. In a further embodiment, one or more of the plurality of environmental sensors 180 are associated with one or more of monitoring device(s) 185. In a further embodiment, some or all functionality of the plurality of environmental sensors 180 optionally is incorporated into the plurality of device sensors 175.

Monitoring device(s) 185 optionally include one or more video capture and/or video monitoring devices configured to record or otherwise process video data with respect to one or more respective devices or respective device components among a plurality of devices, e.g., in a client ecosystem. Additionally or alternatively, monitoring device(s) 185 optionally include one or more audio capture devices, one or more audio recorders, and/or one or more audio monitoring devices configured to record or otherwise process audio data with respect to one or more respective devices or respective device components among a plurality of devices. Additionally or alternatively, monitoring device(s) 185 optionally include one or more audiovisual capture and/or audiovisual monitoring devices configured to record or otherwise process audiovisual data with respect to one or more respective devices or respective device components among a plurality of devices. Additionally or alternatively, monitoring device(s) 185 optionally include one or more photographic capture devices or other image capture devices configured to capture one or more images with respect to one or more respective devices or respective device components among a plurality of devices.

Figure 2:
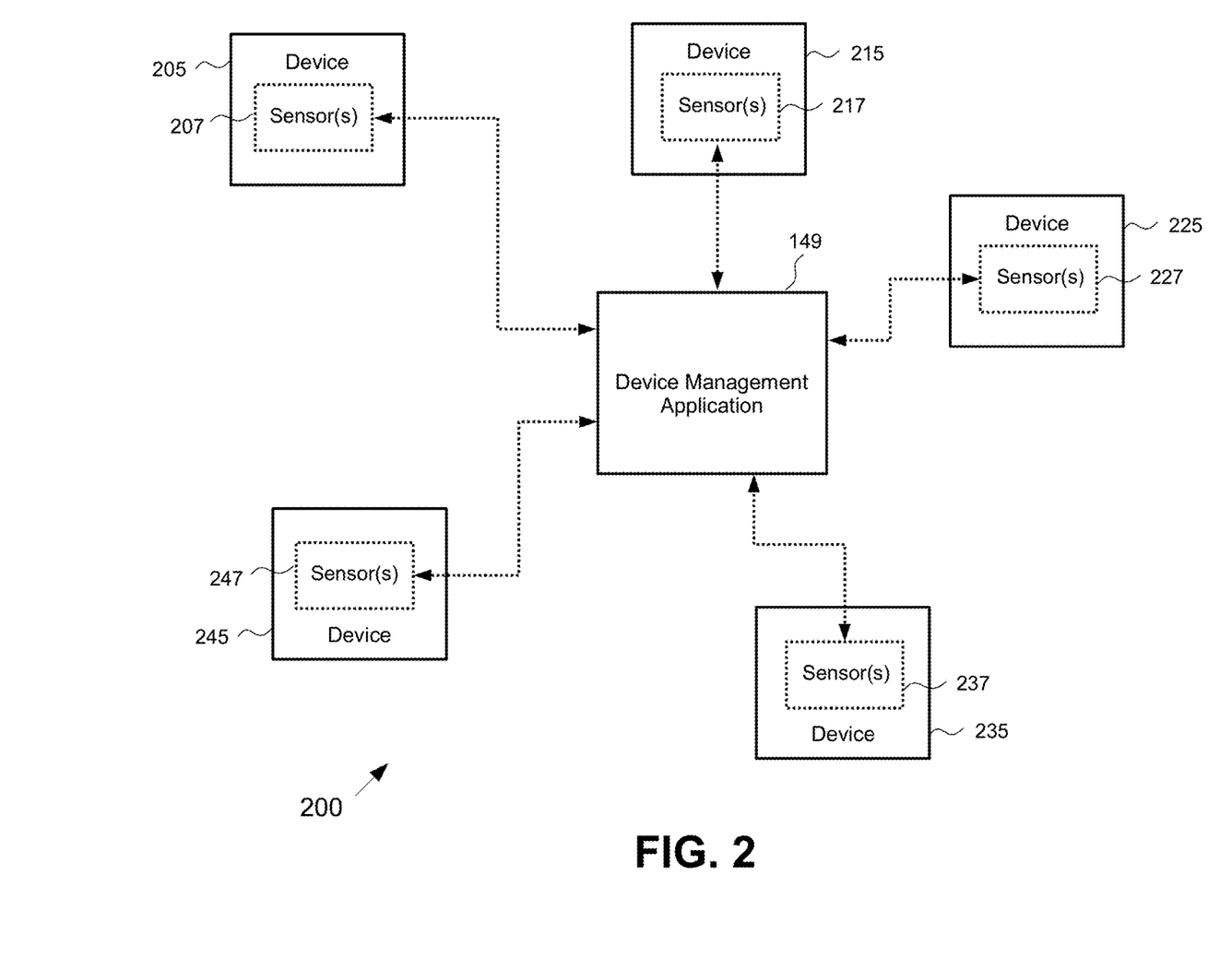
FIG. 2 illustrates a client ecosystem including a plurality of devices, according to one or more embodiments.

FIG. 2 illustrates a client ecosystem 200, according to one or more embodiments. Client ecosystem 200 is managed via computing infrastructure 100, particularly device management application 149. Client ecosystem 200 includes a plurality of devices, specifically device 205, device 215, device 225, device 235, and device 245, communicatively coupled to device management application 149. While five devices are depicted in FIG. 2 for illustrative purposes, client ecosystem 200 may include any number of devices. Each of the respective devices illustrated in client ecosystem 200 is associated with one or more sensors. Specifically, device 205 is associated with sensor(s) 207, device 215 is associated with sensor(s) 217, device 225 is associated with sensor(s) 227, device 235 is associated with sensor(s) 237, and device 245 is associated with sensor(s) 247. A given sensor among sensor(s) 207, sensor(s) 217, sensor(s) 227, sensor(s) 237, or sensor(s) 247 respectively associated with device 205, device 215, device 225, device 235, or device 245 is located within the respective device, is located on or otherwise attached to the respective device, or is located in the vicinity of (e.g., within a defined range of) the respective device. A given sensor among sensor(s) 207, sensor(s) 217, sensor(s) 227, sensor(s) 237, or sensor(s) 247 respectively associated with device 205, device 215, device 225, device 235, or device 245 is a sensor among the plurality of device sensors 175, is a sensor among the plurality of environmental sensors 180, or is a sensor having both device sensor and environmental sensor functionality. While each of the respective sensors illustrated in FIG. 2 is depicted in association with a single device, one or more of the respective sensors illustrated in FIG. 2 optionally are associated with multiple devices. In an embodiment, as reflected in the methods described herein, device management application 149 serves as a centralized virtual agent that captures sensor data related to device 205, device 215, device 225, device 235, and/or device 245 in client ecosystem 200. According to such embodiment, device management application 149 optionally communicates with or accesses all or a subset of sensor(s) 207, sensor(s) 217, sensor(s) 227, sensor(s) 237, or sensor(s) 247 respectively associated with device 205, device 215, device 225, device 235, or device 245 via machine to machine communication (M2M communication).

Figure 3:
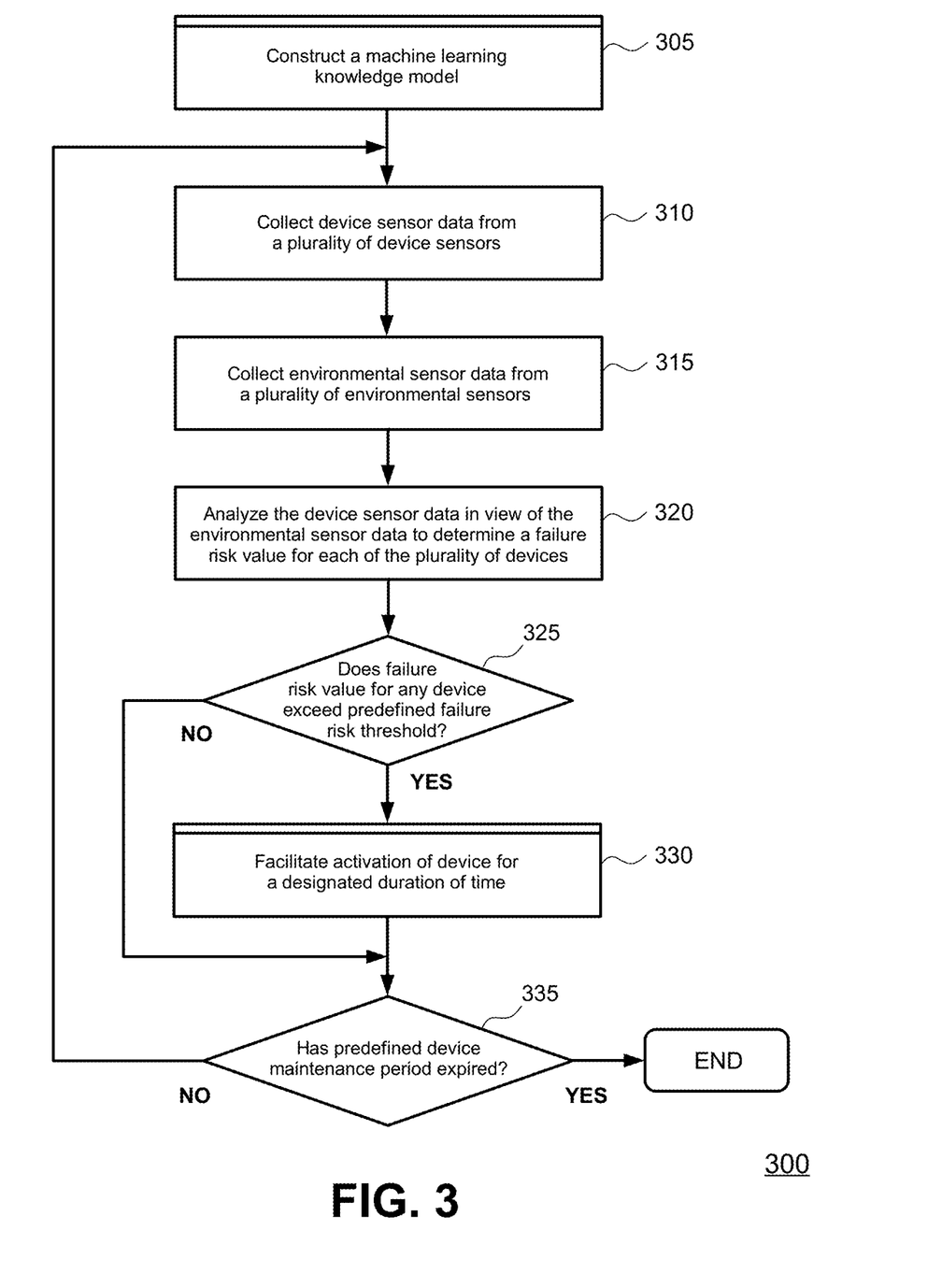
FIG. 3 illustrates a method of managing device maintenance via artificial intelligence, according to one or more embodiments.

FIG. 3 illustrates a method 300 of managing maintenance of a plurality of devices in a client ecosystem (e.g., client ecosystem 200) via artificial intelligence. The plurality of devices in the context of the method 300 and the other methods described herein optionally include machine(s), hardware-based computing system(s), article(s) of manufacture, and/or appliance(s) capable of being managed through a network (e.g., a local area network in a home or office environment). For instance, the plurality of devices may be constituent components of a smart home or smart office configuration. In an embodiment, the client ecosystem is a local area network environment, e.g., in a home or a workplace. One or more steps associated with the method 300 and the other methods described herein may be carried out in a client-server computing environment (e.g., computing infrastructure 100) including a network (e.g., network 195). A device management application in a server system of the client-server computing environment (e.g., device management application 149 in server system 135 of computing infrastructure 100) facilitates processing according to the method 300 and the other methods described herein. The device management application interacts with each of one or more clients via a respective client interface associated with a client application of a client computing system (e.g., client application interface 121 associated with client application 119 of client computing system 105). In the context of the method 300 and the other methods described herein, the one or more clients optionally include one or more entities associated with management of the plurality of devices in the client ecosystem. Additionally or alternatively to the client-server computing environment, one or more steps associated with the method 300 and the other methods described herein may be carried out within one or more workloads of a cloud computing environment. Additionally or alternatively, one or more steps associated with the method 300 and the other methods described herein may be carried out in a peer-to-peer network environment, in which case one or more of the method steps described herein may be carried out via a peer application of a peer computing system.

In the context of the method 300 and the other methods described herein, the device management application provides, or is capable of providing, any entity associated with the client ecosystem or the plurality of devices therein advance notice of any personal data collection, including data collection via sensors, monitoring device(s), and/or autonomous/semi-autonomous device(s). The device management application further provides, or is capable of providing, any affected entity an option to opt in or opt out of any such personal data collection at any time. Optionally, the device management application transmits at least one notification to any affected entity each time any such personal data collection occurs and/or at designated time intervals.

The method 300 begins at step 305, where the device management application constructs a machine learning knowledge model associated with the plurality of devices in the client ecosystem based upon at least one course of device evaluation. The machine learning knowledge model in the context of the various embodiments described herein is a predictive device maintenance model configured to determine device degradation aspects associated with the plurality of devices. The at least one course of device evaluation optionally is defined by one or more predefined device evaluation periods. According to such embodiment, the device management application may collect information during a course of device evaluation that coincides with or occurs within a given predefined device evaluation period. During the at least one course of device evaluation, the device management application observes ongoing device operation, including device activation, device functionality/activity, device battery discharge, and/or device deactivation. In an embodiment, the device management application stores data collected based upon the at least one course of device evaluation among knowledge base data (e.g., knowledge base data 157) associated with the machine learning knowledge model. The device management application interfaces with the machine learning knowledge model via a model representation (e.g., machine learning knowledge model representation 151). In a further embodiment, the device management application maps respective components of a single device individually. According to such further embodiment, the device management application constructs the machine learning knowledge model based upon analyzing the respective device components individually and furthermore based upon analyzing any interaction between the respective device components. Thus, such further embodiment entails both analysis of respective device components individually as well as analysis of the respective device components in the aggregate. A method of constructing the machine learning knowledge model in accordance with step 305 is described with respect to FIG. 4.

Upon construction of the machine learning knowledge model at step 305, the device management application proceeds to managing device maintenance through data collection and analysis, particularly during periods of client absence or unavailability. As reflected in the other steps of the method 300, such device maintenance management optionally occurs during a predefined device maintenance period, e.g., during a period in which one or more clients associated with the client ecosystem are absent or otherwise unavailable for maintenance purposes. The predefined device maintenance period optionally is designated by the device management application or alternatively is designated by any client associated with the client ecosystem. The predefined maintenance period optionally is a predefined period of time, or alternatively the device management application or any client associated with the client ecosystem may end the predefined maintenance period dynamically, e.g., at the conclusion of extended client absence from the client ecosystem. Additionally or alternatively, device maintenance management as reflected in the steps of the method 300 may occur within other durations as designated by the device management application and/or any client associated with the client ecosystem.

At step 310, the device management application collects, from a plurality of IoT device sensors (e.g., the plurality of device sensors 175), device sensor data associated with each of the plurality of devices in the client ecosystem. Each of the plurality of device sensors optionally is associated with a single device or alternatively is associated with multiple devices. In an embodiment, each of the plurality of device sensors is located within, is located on or otherwise attached to, or is otherwise associated with one or more respective devices or respective device components among the plurality of devices in the client ecosystem. The device sensor data includes data from one or more device sensors affixed to or other otherwise associated with at least one physical (e.g., mechanical and/or electrical) component of the device. The device sensor data includes idle status (i.e., whether a device or device component is idle or active), mechanical functionality metric(s), electrical functionality metric(s), dust level, moisture level (related to weather or other water sources), rust level, and/or battery discharge metric(s) (e.g., a metric indicating percentage of remaining battery power). For instance, device sensor data associated with a device fan system may include data related to mechanical functionality of the device fan, including susceptibility to corrosion. Additionally or alternatively, the device sensor data includes data captured via sensors associated with one or more monitoring devices (e.g., monitoring device(s) 185), such as a camera, a microphone, or other audio/video/audiovisual recording device. The one or more monitoring devices may record audio, video, and/or audiovisual data associated with at least one physical component of the device. For instance, video feed data captured via a sensor associated with a device fan system may capture imagery related to functionality of the device fan, including the smoothness of fan blade movement and/or susceptibility to jamming. In a further embodiment, the device management application collects data with regard to device degradation aspects such as dust level or moisture level based upon camera feed sensor data associated with the one or more monitoring devices.

In an embodiment, the device management application collects the device sensor data according to step 310 during the predefined device maintenance period. The device management application optionally adds the collected device sensor data to the knowledge base data. According to an embodiment in which the device management application maps respective components of a single device individually, the device management application collects device sensor data specific to each respective component. For instance, an appliance such as a refrigerator may include multiple control systems with separate functionality, in which case the device management application may collect device sensor data specific to each control system and any hardware (e.g., mechanical or electrical aspect) related thereto. In a further embodiment, the device management application receives device sensor data directly from one of more of the plurality of device sensors via M2M communication.

At step 315, the device management application collects, from a plurality of IoT environmental sensors (e.g., the plurality of environmental sensors 180), environmental sensor data associated with each of the plurality of devices in the client ecosystem. Each of the plurality of environmental sensors optionally is associated with a single device or alternatively is associated with multiple devices. In an embodiment, each of the plurality of environmental sensors is located within, is located on or otherwise attached to, or otherwise is operatively coupled to or associated with, e.g., located within a defined range of, one or more respective devices or respective device components among the plurality of devices in the client ecosystem. The environmental sensor data includes one or more of weather information (temperature, humidity, precipitation, wind speed, etc.), air quality metric(s), metric(s) regarding contaminants or impurities (e.g., smoke or chemicals), etc. Additionally or alternatively, the environmental sensor data includes data from sensors associated with one or more monitoring devices, such as a camera, a microphone, or other audio/video/audiovisual recording device. For instance, the device management application may analyze a video feed captured via a camera sensor to determine precipitation or wind speed in the vicinity of an outdoor device among the plurality of devices.

In an embodiment, the device management application collects the environmental sensor data during the predefined device maintenance period. The device management application optionally adds the collected environmental sensor data to the knowledge base data. According to an embodiment in which the device management application maps respective components of a single device individually, the device management application collects environmental sensor data specific to each respective component. In another embodiment, the device management application receives environmental sensor data directly from one of more of the plurality of environmental sensors via M2M communication. In a further embodiment, in the context of steps 310 and 315, the device management application collects data pertaining to both device aspect(s) and environmental aspect(s), in which case the device management application optionally classifies such data as both device sensor data and environmental sensor data. For instance, the device management application may collect moisture-related data that pertains to both device wear and environmental exposure, in which case the device management application may log or otherwise store the moisture-related data for both device wear analysis and environmental exposure analysis.

At step 320, the device management application analyzes, via the machine learning knowledge model, the device sensor data in view of the environmental sensor data to determine a failure risk value for each of the plurality of devices. In an embodiment, the device management application determines the failure risk value for a given device among the plurality of devices in view of one or more of a plurality of factors. The plurality of factors optionally include a device wear factor for the device derived based upon the device sensor data collected for the device in accordance with step 310 and/or operational information for the device collected and stored in the context of constructing the machine learning knowledge model. The device management application optionally determines the device wear factor based upon age of the device, mechanical condition of the device or components thereof, electrical condition of the device or components thereof, dust level of the device and/or components thereof, moisture level of the device or components thereof, and/or battery discharge status of the device. Furthermore, the plurality of factors optionally include an environmental exposure factor based upon the environmental sensor data associated with the device collected in accordance with step 315 and/or environmental information for the device collected and stored in the context of constructing the machine learning knowledge model. The device management application optionally determines the environmental exposure factor based upon environmental measurements made within a defined range of the device (e.g., within three meters of the device), including humidity level, precipitation level, ultraviolet light level, air quality level, etc. Additionally, the plurality of factors optionally include idle cycle length, which in the context of the various embodiments described herein is a length of time since the most recent activation of the device. In an embodiment, the device management application calibrates the failure risk value for the device based upon idle cycle length as a function of a predefined idle time threshold associated with the device. A predefined idle time threshold for a given device in the context of the various embodiments designates a baseline period of idle time for which the device is expected to function properly without activation. The device management application determines a relatively higher failure risk value for a given device having a relatively lower predefined idle time threshold and conversely determines a relatively lower failure risk value for a given device having a relatively higher predefined idle time threshold. The device management application establishes the predefined idle time threshold for a given device based upon machine learning knowledge model analysis. The device management application calculates the failure risk value based upon one or more of the plurality of factors.

According to one scenario, the device management application calculates the failure risk value as the product of the device wear factor, the environmental exposure factor, and the idle cycle length. According to an alternative scenario in which idle degradation substantially outweighs device wear and environmental exposure (e.g., for an indoor device with high durability), the device management application calculates the failure risk value based upon only idle cycle length. According to the aforementioned embodiment pertaining to predefined idle time threshold, the device management application calculates the failure risk value in such alternative scenario based upon only idle cycle length as a function of the predefined idle time threshold associated with the device. In both of the aforementioned scenarios, the failure risk value for a device increases as the length of an idle cycle increases. For instance, in the event that the device is a fan, the likelihood of fan failure may increase based upon increased length of a period of inactivity. In a further embodiment, the device management application calculates the failure risk value based upon one or more of the plurality of factors in view of information obtained from at least one predictive error log. According to such further embodiment, the device management application optionally populates the at least one predictive error log based upon crowdsourced information collected during construction of the machine learning knowledge model. A global version of the at least one predictive error log optionally is stored externally to the server system and is cloud-based. A local version of the at least one predictive error log optionally is stored locally within at least one database associated with the server system.

In a further embodiment, the device management application quantifies failure risk value on a predefined failure risk value scale. The failure risk value scale optionally is defined by the device management application or alternatively is defined by any client associated with the client ecosystem. According to such further embodiment, the failure risk value scale optionally is an integer scale, with a lowest integer (e.g., "0") indicating lowest relative failure risk and a highest integer (e.g., "100") indicating highest relative failure risk. The failure risk value scale optionally reflects percentage risk. For instance, given a failure risk value scale from 0 to 100, a value of 50 for a given device may indicate a potential failure risk of 50%. According to an embodiment in which the device management application maps respective components of a single device individually, the device management application optionally calculates a failure risk value for each respective component of the device. According to such embodiment, the device management application calculates the failure risk value for each respective component of the device based upon one or more of the aforementioned plurality of factors. The device management application optionally calculates the failure risk value for the device based upon the failure risk values calculated for each respective component of the device or alternatively a designated subset of the respective components of the device. In an embodiment, the device management application calculates the failure risk value for the device as an average of the failure risk values calculated for each respective component of the device or as an average of a designated subset of the respective components of the device. In an alternative embodiment, the device management application calculates the failure risk value for the device as a sum of the failure risk values calculated for each respective component of the device or as a sum of a designated subset of the respective components of the device.

At step 325, the device management application determines whether the failure risk value for any device (i.e., for one device or for multiple devices) among the plurality of devices exceeds a predefined failure risk threshold. The predefined failure risk threshold is a value defined on the failure risk value scale. In an embodiment, the device management application defines a single predefined failure risk threshold for all device types (such that relevant metrics for each device type are normalized for purposes of direct comparison). Alternatively, the device management application defines a separate predefined failure risk threshold for each device type. In an embodiment, in the context of making the determination according to step 325, the device management application iteratively compares each device among the plurality of devices to the predefined failure risk threshold (either a single predefined failure risk threshold defined for all device types or a predefined failure risk threshold defined for the applicable device type).

Responsive to determining that no failure risk value for any device among the plurality of devices exceeds the predefined failure risk threshold, the device management application proceeds to step 335. Responsive to determining that the failure risk value for a device among the plurality of the devices exceeds the predefined failure risk threshold, at step 330 the device management application facilitates activation of the device for a designated duration of time. In an embodiment, the device management application activates the device autonomously, i.e., without user intervention. According to such embodiment, upon autonomous device activation, the device management application optionally transmits at least one activation notification to an entity associated with the device or a client associated with the client ecosystem. The at least one activation notification optionally includes identity of the activated device(s) or device component(s) and reason(s) for activation. Alternatively, the device management application provides at least one activation recommendation to an entity associated with the device or a client associated with the client ecosystem to advise or otherwise enable the entity or the client to activate the device. In another embodiment, the device management application activates the device without a payload. In the context of the various embodiments described herein, activating the device without a payload entails activating the device only for purposes of maintenance rather than for purposes of influencing an external outcome. Alternatively, the device management application activates the device with a payload as pre-designated by an entity associated with the device or a client associated with the client ecosystem. According to the aforementioned embodiment pertaining to predefined idle time threshold, the device management application activates the device in order to terminate an idle cycle having a length exceeding the predefined idle time threshold associated with the device, e.g., as reflected by the idle cycle length factor derived in the context of calculating the failure risk value. In a further embodiment, the device management application facilitates activation of one or more of the plurality of devices via M2M communication. In the event that multiple devices among the plurality of devices exceed the predefined failure risk threshold, the device management application facilitates activation of each of the multiple devices in accordance with step 330.

The device management application facilitates activation of the device according to step 330 by facilitating operation of the device in one or more active/non-idle modes, e.g., by sending at least one control signal to the device. In an embodiment, the device management application facilitates activation of the device by facilitating activation of at least one component of the device, e.g., one or more components among multiple device components. In another embodiment, the device management application facilitates activation of the device by turning on the device or by otherwise cycling the device. In a further embodiment, the device management application facilitates activation of the device by facilitating charging of a battery component associated with the device. In a further embodiment, the device management application facilitates activation of the device by initiating operation of at least one physical component of the device. According to such further embodiment, the device management application initiates operation of at least one physical component of the device by facilitating movement of at least one mechanical component of the device, i.e., causing one or more mechanical parts of the device to move or otherwise operate. For instance, facilitating movement of at least one mechanical component of a fan device entails facilitating activation of a fan engine subject to dust accumulation. In another instance, facilitating movement of at least one mechanical component of a vehicle entails facilitating activation of a vehicle motor subject to system failure from an excessively long idle cycle. Additionally or alternatively, the device management application initiates operation of at least one physical component of the device by activating circuitry of at least one electrical component of the device, i.e., causing one or more electrical parts of the device to operate.

In an embodiment, the device management application determines the designated duration of time for which the device management application facilitates activation of the device at least in part based upon the device sensor data associated with the device. For instance, the device management application may determine the designated duration of time at least in part based upon the speed of dust removal and/or moisture removal through operation of the device. Additionally or alternatively, the device management application determines the designated duration of time at least in part based upon the environmental sensor data associated with the device. For instance, the device management application may determine the designated duration of time at least in part based upon weather conditions within a defined range of the device. According to such example, relatively higher humidity within the defined range of the device may require a more extended duration of device activation than would be necessary in relatively lower humidity. In another embodiment, the device management application determines a relatively higher designated duration of time responsive to determining that the device sensor data associated with the device and/or the environmental sensor data associated with the device indicates that the device would benefit from more extended activation. In a further embodiment, the device management application dynamically determines the designated duration of time based upon an amount of time required to address any cause with regard to the failure risk value exceeding the predefined failure risk threshold. For instance, responsive to determining that the excessive failure risk value for the device is caused by dust collection upon a physical component of the device as identified by the device sensor data, the device management application may dynamically determine the designated duration of time based upon an amount of time required to remove the dust. Accordingly, the device management application may deactivate the device once the device sensor data collected in real time indicates that the dust is removed. A method of facilitating activation of the device in accordance with step 330 is described with respect to FIG. 5.

At step 335, the device management application determines whether the predefined device maintenance period has expired. Responsive to determining that the predefined device maintenance period has expired, the method 300 ends. Responsive to determining that the predefined device maintenance period has not expired, the device management application returns to step 310, wherein the device management application repeats the previously discussed sensor data collection and analysis steps.

Figure 4:
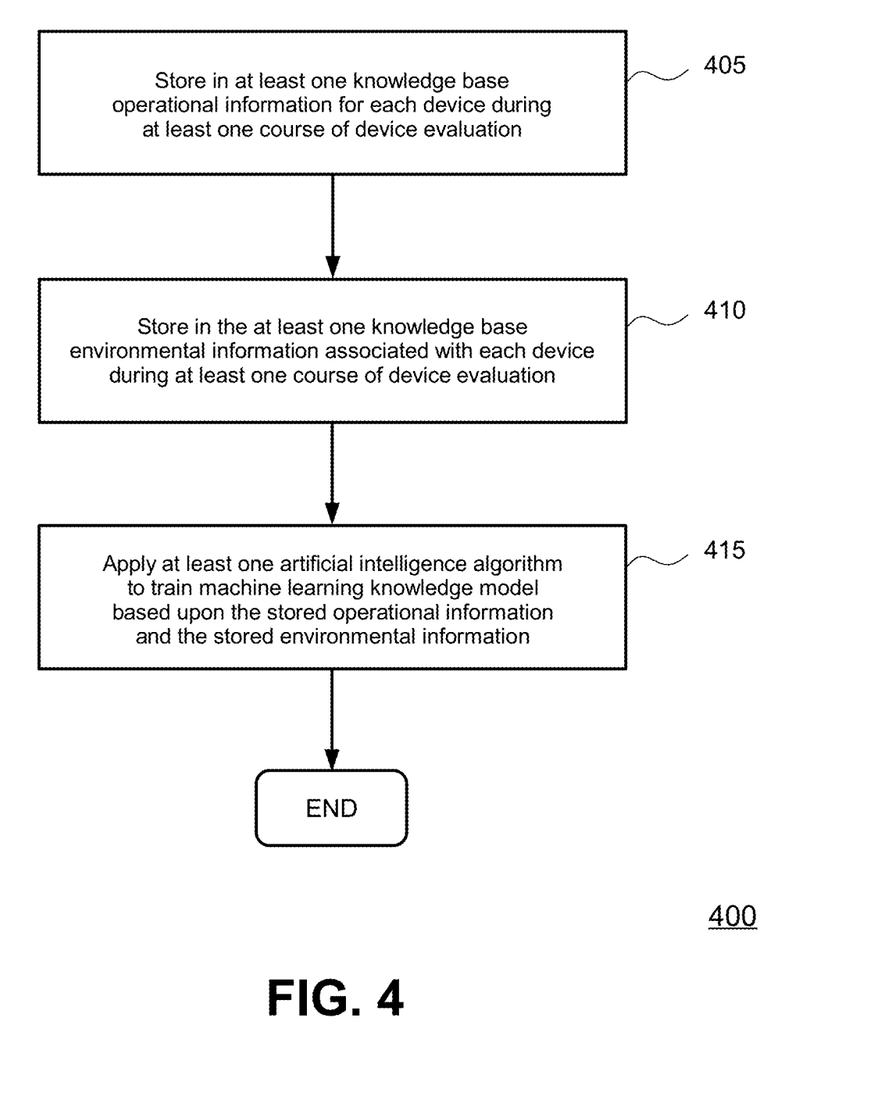
FIG. 4 illustrates a method of constructing a machine learning knowledge model, according to one or more embodiments.

FIG. 4 illustrates a method 400 of constructing the machine learning knowledge model. The method 400 provides one or more example embodiments with respect to step 305 of the method 300. The method 400 begins at step 405, where the device management application stores in at least one knowledge base operational information for each of the plurality of devices during the at least one course of device evaluation. The at least one knowledge base is configured to store some or all aspects of the knowledge base data associated with the machine learning knowledge model. In an embodiment, the operational information includes device activation information, device functionality characteristics, device deactivation information, device battery characteristics, information regarding any device exception/interrupt, device emergency information, idle degradation information, and/or any other information related to device operation. As for device functionality characteristics, the device management application optionally obtains and stores manufacturer information and/or crowdsourced data with respect to physical dimensions, mechanical characteristics, electrical characteristics (e.g., circuitry characteristics), vibration patterns, and/or other aspects related to functionality of each device or respective components thereof. As for device battery characteristics, the device management application optionally obtains and stores manufacturer information and/or crowdsourced data with respect to battery discharge patterns in idle mode and one or more active modes and/or optionally obtains and stores manufacturer information and/or crowdsourced data with respect to battery discharge pattern based upon payload. As for idle degradation information, the device management application optionally obtains and stores manufacturer information and/or crowdsourced data with respect to inherent device component idle degradation characteristics and environmentally-based idle degradation characteristics.

In an embodiment, the device management application collects aspects of the operational information from each of the plurality of devices associated with the client ecosystem. Additionally or alternatively, the device management application collects aspects of the operational information from analogous devices in other ecosystems, e.g., other client ecosystems having similar conditions to the client ecosystem. Accordingly, the device management application optionally collects aspects of the operational information by crowdsourcing. In another embodiment, the device management application stores the operational information in at least one database, either associated with the server system or cloud-based. In a further embodiment, the device management application indexes the operational information in at least one device execution log. According to such further embodiment, the device management application optionally indexes each respective component of the device individually such that each respective component is separately traceable. For instance, the device management application optionally analyzes the at least one device execution log to identify battery discharge pattern with respect to payload.

In an embodiment, the device management application collects aspects of the operational information at step 405 by observing device operation during the at least one course of device evaluation via the plurality of device sensors. According to such embodiment, in the context of storing the operational information, the device management application collects device evaluation data from the plurality of device sensors. Additionally or alternatively, the device management application collects aspects of the operational information based upon textual analysis of product literature (instructions/specifications), publications, device error logs, and/or other data associated with one or more of the plurality of devices. The device management application facilitates such textual analysis via natural language processing (NLP) e.g., natural language understanding (NLU). The device management application optionally initiates or otherwise facilitates an application programming interface (API) call to an application having NLP capabilities, e.g., a cloud-based NLP application. Additionally or alternatively, the device management application collects aspects of the operational information based upon analysis of video, audio, and/or audiovisual data associated with one or more of the plurality of devices, such as informational videos or audio-based information associated with the one or more devices. The device management application facilitates such analysis via audiovisual-based NLP (e.g., speech recognition, video to text) or via another form of audiovisual processing. In a further embodiment, in the context of storing the operational information, the device management application facilitates construction of an operational artificial neural network (ANN) to collect operational data from the plurality of device sensors. The device management application optionally uses operational data collected via the operational ANN in the context of deriving the device wear factor for purposes of determining the failure risk value for one or more of the plurality of devices.

At step 410, the device management application stores in the at least one knowledge base environmental information associated with each of the plurality of devices during the at least one course of device evaluation. In an embodiment, the device management application collects aspects of the environmental information associated with each of the plurality of devices associated with the client ecosystem. Additionally or alternatively, the device management application collects aspects of the environmental information associated with analogous devices in other ecosystems. Accordingly, the device management application optionally collects aspects of the environmental information by crowdsourcing. In a further embodiment, the environmental information includes textual data and/or audiovisual data with respect to weather trends, weather patterns, or other environmental aspects in the vicinity of (e.g., within a defined range of) one or more of the plurality of devices. According to such further embodiment, the device management application optionally facilitates analysis of any such textual data via NLP (e.g., NLU), and additionally or alternatively the device management application optionally facilitates analysis of any such audiovisual data via audiovisual-based NLP (e.g., speech recognition, video to text) or via another form of audiovisual processing. In a further embodiment, the device management application stores the environmental information in at least one database, either associated with the system or cloud-based. Additionally or alternatively, the device management application indexes the environmental information in the at least one device execution log.

In an embodiment, in the context of storing the environmental information at step 410, the device management application collects environmental evaluation data from the plurality of environmental sensors. In a further embodiment, in the context of storing the environmental information, the device management application facilitates construction of an environmental artificial neural network (ANN) to collect environmental data from the plurality of environmental sensors. The device management application optionally uses environmental data collected via the environmental ANN in the context of deriving the environmental exposure factor for purposes of determining the failure risk value for one or more of the plurality of devices. The environmental ANN addresses nuances based upon environmental differences among respective device locations. Optionally, aspects of the environmental ANN are incorporated into the previously discussed operational ANN. In a further embodiment, the device management application stores the information processed at step 405 and/or step 410 in the form of device datapoints. Such device datapoints optionally include associated metadata, e.g., time/date information, tag(s) for purposes of datapoint classification, information indicating relationship(s) with respect to other device datapoints, etc.

At step 415, the device management application applies at least one artificial intelligence algorithm to train the machine learning knowledge model based upon the stored operational information and the stored environmental information. In an embodiment, based upon training of the machine learning knowledge model, the device management application identifies any correlation between device degradation characteristics and environmental variables. For instance, based upon the trained model, the device management application may identify a correlation between level of rust in a device part and humidity level associated with the air within a defined range of the device part. In a further embodiment, the device management application analyzes information from the at least one device execution log to identify at least one battery discharge pattern for each of the plurality of devices based upon device payload and/or environmental variables.

In an embodiment, the at least one artificial intelligence algorithm applied at step 415 includes at least one clustering algorithm that generates at least one output reflecting failure trends with respect to the plurality of devices. Based upon the stored operational information and the stored environmental information (particularly crowdsourced information from multiple client ecosystems), the device management application applies at least one clustering algorithm in order to train the machine learning knowledge model with respect to device failure patterns based upon device payload and/or environmental variables. With respect to affected device(s) or device component(s) among the plurality of devices, the at least one output optionally includes device payload data related to device failure, environmental condition data related to device failure, and/or timestamp data related to device failure. For instance, the device management application may determine via clustering that there is a pattern with respect to outdoor cooking units failing relatively more quickly in relatively more humid environments. In another instance, the device management application may determine via clustering that there is a pattern with respect to a fan motor of a particular fan model failing relatively more quickly when average use of such fan model exceeds twelve hours a day.

In an embodiment, the machine learning knowledge model applied at step 415 is a multi-agent reinforcement learning model. According to such embodiment, the at least one artificial intelligence algorithm includes a multi-agent reinforcement learning (MARL) algorithm that applies multi-objective optimization to the plurality of devices. A MARL algorithm in the context of the various embodiments described herein applies multi-objective optimization to achieve a device usage amount that addresses maintenance requirements while maximizing device longevity. More specifically, the device management application addresses multiple objectives with respect to the plurality of devices by addressing device idle cycles for maintenance purposes while also avoiding excessive device use based upon device wear constraints and while also addressing environmental exposure constraints. Accordingly, based upon training the model according to step 415, the device management application addresses a tradeoff between device cycling versus cost of maintenance relative to the stored operational information and the stored environmental information (including any available device sensor data and any available environmental sensor data).

In the context of training the multi-agent reinforcement learning model, the MARL algorithm is associated with at least one reward function. In the context of the multi-agent reinforcement learning model and the MARL algorithm, each agent among the multiple agents is a virtual entity associated with a cluster of devices among the plurality of devices having similar functionality and/or objectives. In the context of the various embodiments described herein, a reward function among the at least one reward function associated with the MARL algorithm is a function assigned to, or otherwise defined for, each agent (cluster of devices) by determining whether such agent is operating as intended. Thus, a reward function assigned to each agent determines whether such agent is operating in accordance with baseline operation, i.e., expected operation. The reward function for a respective device associated with an agent serves to measure and normalize device activity. The device management application negatively adjusts a reward function assigned to a respective device when a malfunction occurs prior to a baseline lifespan associated with the respective device. Conversely, the device management application positively adjusts a reward function assigned to a respective device when a malfunction occurs only subsequent to a baseline lifespan associated with the respective device. The baseline lifespan associated with a respective device is a lifespan expected based upon device characteristics (e.g., determined from operational information stored per step 405) and/or environmental characteristics (e.g., determined from environmental information stored per step 410) associated with the respective device. The reward function assigned to an agent is derived based upon respective reward functions assigned to respective devices associated with such agent, e.g., based upon averaging or otherwise aggregating the respective reward functions assigned to the respective devices. Based upon a negative adjustment to a reward function for a respective device associated with an agent (i.e., a negative maintenance state change for the respective device) and/or based upon a positive adjustment to the reward function for the respective device (i.e., a positive maintenance state change for the respective device), the device management application correspondingly updates a maintenance policy associated with the agent. The failure risk value determined for a respective device is inversely proportional to the reward function assigned to the respective device. Accordingly, in the context of determining a failure risk value for a respective device among the plurality of devices, a positive reward function adjustment decreases failure risk value, while a negative reward function adjustment increases failure risk value.

In an embodiment, the device management application trains the multi-agent reinforcement learning model in conjunction with a long short-term memory recurrent neural network (LSTM-RNN) architecture configured to store time series pattern data with respect to the plurality of devices. The device management application optionally applies LSTM-RNN modeling for purposes of time series forecasting with respect to the plurality of devices. Based upon LSTM-RNN modeling, the device management application may store time series pattern data that exists with respect to each device (or a subset of devices) among the plurality of devices. Through time series forecasting, the device management application optionally identifies one or more cycle patterns over time with respect to the plurality of devices and/or components thereof. Since multi-agent reinforcement learning alone cannot address device state information as a function of time, LSTM-RNN modeling stores state changes as a function of time for each device (or a subset of devices) among the plurality of devices that can be used as input for the MARL algorithm in the context of training the multi-agent reinforcement learning model. Based upon state changes with respect to devices over time, the device management application optionally uses LSTM-RNN data to predict device anomalies. Specifically, using LSTM-RNN modeling, the device management application optionally derives at least one timestamped pattern with respect to stored input data, thus identifying anomalies in device data based upon timestamps.

Figure 5:
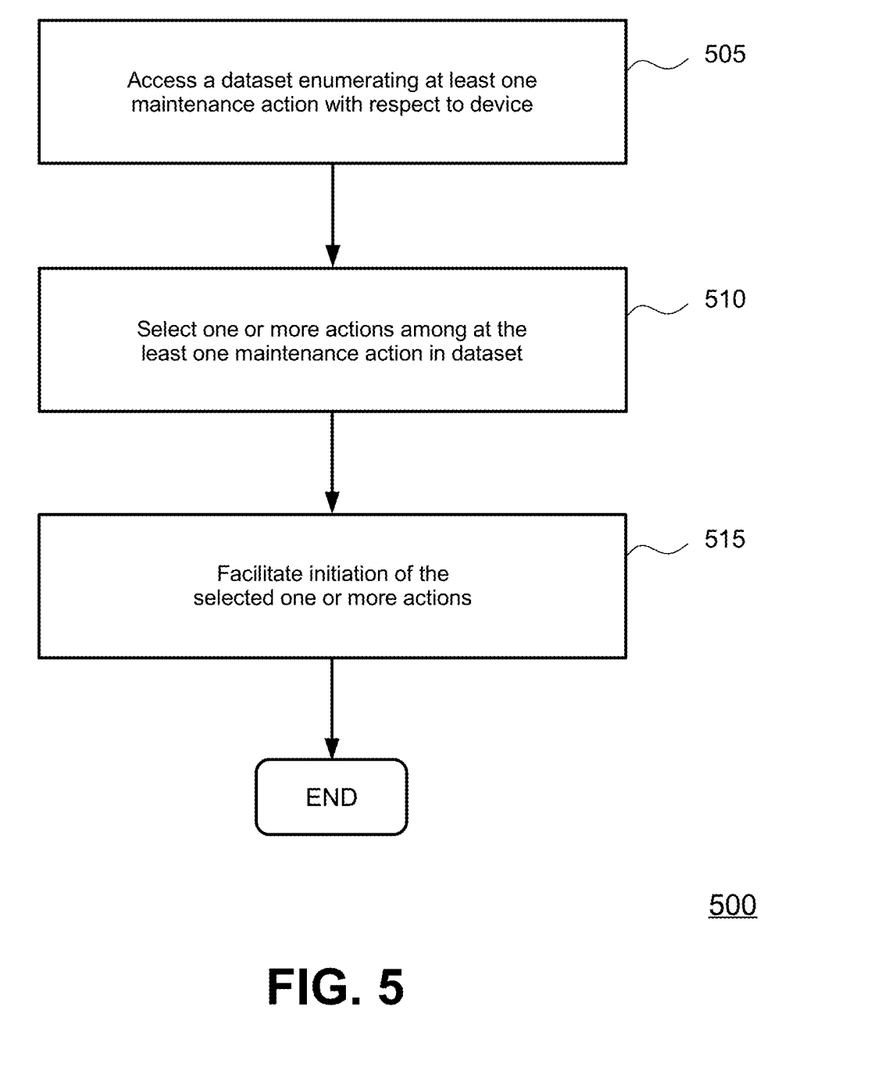
FIG. 5 illustrates a method of facilitating activation of any device among a plurality of devices having a failure risk value that exceeds a predefined failure risk threshold, according to one or more embodiments.

FIG. 5 illustrates a method 500 of facilitating activation of any device among the plurality of devices having a failure risk value that exceeds the predefined failure risk threshold. The method 500 provides one or more example embodiments with respect to step 330 of the method 300. The method 500 begins at step 505, where the device management application accesses a dataset enumerating at least one maintenance action with respect to the device. In an embodiment, the dataset is represented in a list or another data structure. A dataset representation in list form optionally is ordered based upon maintenance priority, e.g., higher priority maintenance actions are ordered prior to and/or displayed more prominently than lower priority maintenance actions. At step 510, the device management application selects one or more actions among the at least one maintenance action in the dataset based upon the failure risk value and the analysis of the device sensor data in view of the environmental sensor data. The device management application optionally selects a relatively greater quantity of maintenance actions and/or relatively more impactful maintenance action(s) in the event that the failure risk value is relatively higher. Conversely, device management application optionally selects a relatively lower quantity of maintenance actions and/or relatively less impactful maintenance action(s) in the event that the failure risk value is relatively lower. The device management application optionally selects among the at least one maintenance action differently based upon the environmental exposure factor. Based upon different climates, environmental exposure with respect to the respective device components would differ. For instance, given two vehicles having identical component systems, one vehicle in a desert and the other vehicle on a humid coastline, the magnitude and/or frequency of maintenance action (e.g., frequency of activation) required for each respective vehicle and the type of maintenance required may differ for each vehicle. For instance, given greater likelihood of mechanical degradation from salt and moisture on the humid coastline as opposed to in the desert, the device management application may select more frequent maintenance actions and/or maintenance actions of a greater magnitude with respect to mechanical part activation for the vehicle on the humid coastline as opposed to the vehicle in the desert. In a further embodiment, the device management application selects the one or more actions based upon identification of any affected components of the device. For instance, the device management application may select an action addressing a subsystem of a refrigerator appliance consequent to determining based upon the relevant failure risk value (for the refrigerator overall and/or for the refrigerator subsystem specifically) and the analysis of the device sensor data in view of the environmental sensor data that the subsystem requires activation in order to address degradation.

At step 515, the device management application facilitates initiation of the selected one or more actions. In an embodiment, the device management application sends at least one control signal to the device and/or device component(s) in order to activate the device. Additionally or alternatively, the device management application sends at least one signal via M2M communication to at least one device sensor associated with device functionality in order to activate the device. In the event that multiple devices among the plurality of devices exceed the predefined failure risk threshold, the device management application optionally facilitates activation of each of the multiple devices in accordance with the steps of the method 500.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
constructing a multi-agent reinforcement learning (MARL) model associated with a plurality of devices in a client ecosystem based upon at least one course of device evaluation, wherein constructing the MARL model comprises applying at least one artificial intelligence algorithm to train the MARL model, and wherein the at least one artificial intelligence algorithm includes a MARL algorithm that applies multi-objective optimization to the plurality of devices in order to address device idle cycles while avoiding excessive device use based upon device wear constraints and while addressing environmental exposure constraints;
collecting, from a plurality of device sensors, device sensor data associated with each of the plurality of devices;
collecting, from a plurality of environmental sensors, environmental sensor data associated with each of the plurality of devices;

analyzing, via the MARL model, the device sensor data in view of the environmental sensor data to determine a failure risk value for each of the plurality of devices; and responsive to the failure risk value for any device among the plurality of devices exceeding a predefined failure risk threshold, facilitating activation of the device for a designated duration of time.

2. The computer-implemented method of claim 1, wherein constructing the MARL model further comprises:
storing in at least one knowledge base operational information for each of the plurality of devices during the at least one course of device evaluation; and
storing in the at least one knowledge base environmental information associated with each of the plurality of devices during the at least one course of device evaluation.

3. The computer-implemented method of claim 1, wherein the at least one artificial intelligence algorithm includes at least one clustering algorithm that generates at least one output reflecting failure trends with respect to the plurality of devices.

4. The computer-implemented method of claim 1, wherein the MARL model is trained in conjunction with a long short-term memory recurrent neural network architecture configured to store time series pattern data with respect to the plurality of devices.

5. The computer-implemented method of claim 1, wherein facilitating activation of the device comprises:
accessing a dataset enumerating at least one maintenance action with respect to the device;
selecting one or more actions among the at least one maintenance action in the dataset based upon the failure risk value and the analysis of the device sensor data in view of the environmental sensor data; and
facilitating initiation of the selected one or more actions.

6. The computer-implemented method of claim 1, wherein facilitating activation of the device comprises facilitating charging of a battery component associated with the device.

7. The computer-implemented method of claim 1, wherein facilitating activation of the device comprises activating circuitry of at least one electrical component of the device.

8. The computer-implemented method of claim 1, wherein the designated duration of time is determined at least in part based upon the device sensor data associated with the device.

9. The computer-implemented method of claim 1, wherein the designated duration of time is determined at least in part based upon the environmental sensor data associated with the device.

10. The computer-implemented method of claim 1, wherein facilitating activation of the device comprises facilitating activation autonomously.

11. The computer-implemented method of claim 1, wherein facilitating activation of the device comprises facilitating activation of the device without a payload.

12. A computer program product comprising a computer readable storage medium having program instructions embodied therewith, the program instructions executable by a computing device to cause the computing device to:
construct a MARL model associated with a plurality of devices in a client ecosystem based upon at least one course of device evaluation, wherein constructing the MARL model comprises applying at least one artificial intelligence algorithm to train the MARL model, and wherein the at least one artificial intelligence algorithm includes a MARL algorithm that applies multi-objective optimization to the plurality of devices in order to address device idle cycles while avoiding excessive device use based upon device wear constraints and while addressing environmental exposure constraints;
collect, from a plurality of device sensors, device sensor data associated with each of the plurality of devices;
collect, from a plurality of environmental sensors, environmental sensor data associated with each of the plurality of devices;
analyze, via the MARL model, the device sensor data in view of the environmental sensor data to determine a failure risk value for each of the plurality of devices; and
responsive to the failure risk value for any device among the plurality of devices exceeding a predefined failure risk threshold, facilitate activation of the device for a designated duration of time.

13. The computer program product of claim 12, wherein constructing the MARL model further comprises:
storing in at least one knowledge base operational information for each of the plurality of devices during the at least one course of device evaluation; and
storing in the at least one knowledge base environmental information associated with each of the plurality of devices during the at least one course of device evaluation.

14. The computer program product of claim 12, wherein the at least one artificial intelligence algorithm includes at least one clustering algorithm that generates at least one output reflecting failure trends with respect to the plurality of devices.

15. A system comprising:
a processor; and
a memory storing an application program, which, when executed on the processor, performs an operation comprising:
constructing a MARL model associated with a plurality of devices in a client ecosystem based upon at least one course of device evaluation, wherein constructing the MARL model comprises applying at least one artificial intelligence algorithm to train the MARL model, and wherein the at least one artificial intelligence algorithm includes a MARL algorithm that applies multi-objective optimization to the plurality of devices in order to address device idle cycles while avoiding excessive device use based upon device wear constraints and while addressing environmental exposure constraints;
collecting, from a plurality of device sensors, device sensor data associated with each of the plurality of devices;
collecting, from a plurality of environmental sensors, environmental sensor data associated with each of the plurality of devices;
analyzing, via the MARL model, the device sensor data in view of the environmental sensor data to determine a failure risk value for each of the plurality of devices; and
responsive to the failure risk value for any device among the plurality of devices exceeding a predefined failure risk threshold, facilitating activation of the device for a designated duration of time.

16. The system of claim 15, wherein constructing the MARL model further comprises:
- storing in at least one knowledge base operational information for each of the plurality of devices during the at least one course of device evaluation; and
- storing in the at least one knowledge base environmental information associated with each of the plurality of devices during the at least one course of device evaluation.

17. The system of claim 15, wherein the at least one artificial intelligence algorithm includes at least one clustering algorithm that generates at least one output reflecting failure trends with respect to the plurality of devices.

\* \* \* \* \*